US010175136B2

(12) United States Patent
Latini et al.

(10) Patent No.: US 10,175,136 B2
(45) Date of Patent: Jan. 8, 2019

(54) SYSTEM AND METHOD FOR DETECTION OF HYDROCARBON LEAKAGE FROM AN UNDERWATER PIPELINE IN A BODY OF WATER AND HYDROCARBON EXTRACTION UNIT

(71) Applicant: SAIPEM S.p.A., San Donato Milanese (IT)

(72) Inventors: Gilberto Latini, Saltara (IT); Daniele Ripari, Lucrezia di Cartoceto (IT)

(73) Assignee: SAIPEM S.p.A., San Donato Milanese (IT)

( * ) Notice: Subject to any disclaimer, the term of this patent is extended or adjusted under 35 U.S.C. 154(b) by 127 days.

(21) Appl. No.: 15/307,299

(22) PCT Filed: Apr. 29, 2015

(86) PCT No.: PCT/IB2015/053116
§ 371 (c)(1),
(2) Date: Oct. 27, 2016

(87) PCT Pub. No.: WO2015/166429
PCT Pub. Date: Nov. 5, 2015

(65) Prior Publication Data
US 2017/0059441 A1    Mar. 2, 2017

(30) Foreign Application Priority Data

Apr. 29, 2014 (IT) .............................. MI2014A0795

(51) Int. Cl.
*G01M 3/00* (2006.01)
*G01M 3/04* (2006.01)
(Continued)

(52) U.S. Cl.
CPC ............ *G01M 3/002* (2013.01); *F16L 23/003* (2013.01); *F16L 23/032* (2013.01); *G01M 3/04* (2013.01);
(Continued)

(58) Field of Classification Search
CPC ........ G01M 3/002; G01M 3/04; G01M 3/047; F16L 23/003; F16L 23/032; F16L 2201/20; F16L 2201/30; G08B 21/18
See application file for complete search history.

(56) References Cited

U.S. PATENT DOCUMENTS 8,539,818 B2 *    9/2013   van Staden ........... G01M 3/002
                                                    73/40
9,010,356 B2 *    4/2015   Adler ...................... F16L 55/07
                                                    137/312
(Continued)

FOREIGN PATENT DOCUMENTS

EP          1950547          7/2008
JP          S61139737        6/1986
(Continued)

OTHER PUBLICATIONS

Notification Concerning Submission, Obtention or Transmittal of Priority Document for International Application No. PCT/IB2015/053116 dated Jul. 9, 2015.
(Continued)

*Primary Examiner* — Mohamed Barakat
(74) *Attorney, Agent, or Firm* — Neal, Gerber & Eisenberg LLP

(57) ABSTRACT

A leakage detection system configured to detect hydrocarbon leakage from an underwater pipeline in a body of water having a sensor configured to acquire signals related to the temperature of a liquid inside a chamber that is not watertight and which, in use, is full of water and extends along a
(Continued)

portion of underwater pipeline susceptible to leakage, and a control unit, which is connected to the sensor and is configured to control if the temperature of the liquid in the chamber is within an expected range and emit a leakage signal when the temperature of the liquid in the chamber is outside the expected range.

44 Claims, 4 Drawing Sheets

(51) Int. Cl.
    *F16L 23/00*     (2006.01)
    *F16L 23/032*     (2006.01)
    *G08B 21/18*     (2006.01)

(52) U.S. Cl.
    CPC .............. *G01M 3/047* (2013.01); *G08B 21/18* (2013.01); *F16L 2201/20* (2013.01); *F16L 2201/30* (2013.01)

(56) References Cited

U.S. PATENT DOCUMENTS

| | | | |
|---|---|---|---|
| 9,217,317 B2* | 12/2015 | Backes | E21B 43/0122 |
| 2012/0312078 A1* | 12/2012 | Bakhtiar | G01N 29/14 |
| | | | 73/40.5 A |
| 2015/0192488 A1* | 7/2015 | Xu | B63C 11/40 |
| | | | 702/38 |

FOREIGN PATENT DOCUMENTS

| | | |
|---|---|---|
| WO | WO 2003/019069 | 3/2003 |
| WO | WO 2006/050488 | 5/2006 |

OTHER PUBLICATIONS

International Search Report and Written Opinion for International Application No. PCT/IB2015/053116 dated Jun. 23, 2015.
PCT Demand for International Preliminary Examination and Reply to International Search Report and the associated Written Opinion for International Application No. PCT/IB2015/053116 dated Feb. 29, 2016.
Notification of Receipt of Demand by Competent International Preliminary Examining Authority (Form PCT/IPEA/402) for International Application No. PCT/IB2015/053116 dated Mar. 15, 2016.
Second Written Opinion of the International Preliminary Examining Authority for International Application No. PCT/IB2015/053116 dated Mar. 31, 2016.
Reply to the Second Written Opinion of the International Searching Authority for International Application No. PCT/IB2015/053116 dated May 26, 2016.
Notification of Transmittal of the International Preliminary Report on Patentability (Form PCT/IPEA/416) for International Application No. International Application No. PCT/IB2015/053116 dated Jun. 30, 2016.

* cited by examiner

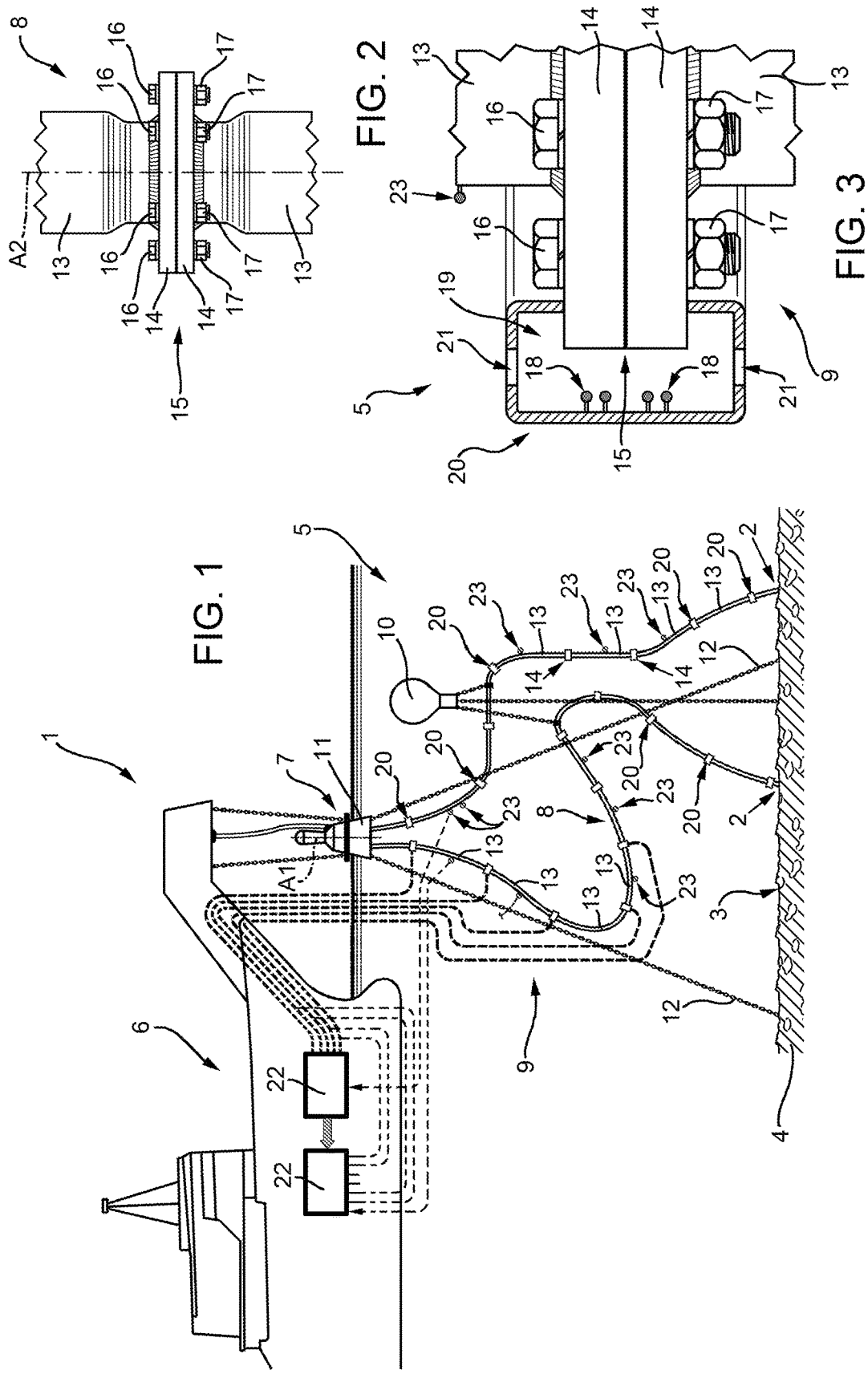

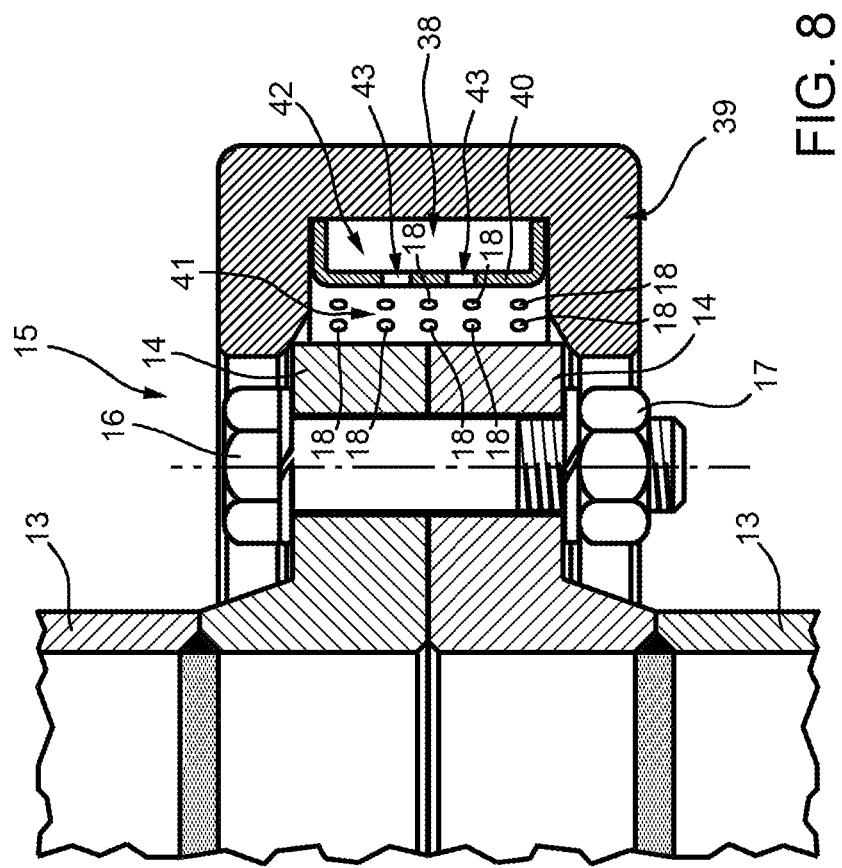

SYSTEM AND METHOD FOR DETECTION OF HYDROCARBON LEAKAGE FROM AN UNDERWATER PIPELINE IN A BODY OF WATER AND HYDROCARBON EXTRACTION UNIT

PRIORITY CLAIM

This application is a national stage application of PCT/IB2015/053116, filed on Apr. 29, 2015, which claims the benefit of and priority to Italian Patent Application No. MI2014A000795, filed on Apr. 29, 2014, the entire contents of which are each incorporated by reference herein.

BACKGROUND

In the field of off-shore hydrocarbon transport via underwater pipelines, it has been found that the underwater pipelines are susceptible to leaks and therefore the release of hydrocarbons into the body of water. It is desirable to detect leaks as soon as possible to avoid significant spillage of hydrocarbons into the body of water and severe damage to the underwater environment.

Among the various known types of underwater pipelines, the so-called flexible 'risers' with flanged joints are those that show a relatively greater tendency of being susceptible to leaks on the flanged joints.

Known systems for detecting leaks in pipelines installed in a body of water comprise ROVs (Remote Operated underwater Vehicles) equipped with various types of sensors to detect possible leaks during periodic inspections along the underwater pipeline.

One type of sensor used for detecting hydrocarbon leakage in a body of water is the so-called 'sniffer', which can be mounted on ROVs or buoys immerged at different depths in the body of water.

The foremost critical aspects of certain of the known art that contemplates the use of sensors mounted on ROVs or buoys consists in that it only allows detecting leaks after a considerable amount of time and with scarce precision, the point of the leak on the underwater pipeline not being readily identifiable. Furthermore, the hydrocarbon detection sensors lack effectiveness in locating small leaks in the open sea, which is notoriously subject to currents that disperse and dilute the hydrocarbons in the body of water. It follows that the currently known leak detection systems are untimely and rather imprecise in locating leaks.

Japanese Patent Document No. 61-139,737 discloses an apparatus for preventing leakage from a flange joint and comprising a detector for detecting the leakage of the fluid and a recovery apparatus for recovering the leaked fluid. However, this apparatus will be hardly adaptable to operate under the high pressure and the severe conditions in the underwater environment.

SUMMARY

The present disclosure relates to a system for detection of hydrocarbon leakage from an underwater pipeline in a body of water.

The advantage of the present disclosure is to provide a system for the detection of hydrocarbon leakage from an underwater pipeline in a body of water that alleviates certain of the drawbacks of certain of the known art.

In accordance with the present disclosure, a system is provided for the detection of hydrocarbon leakage from an underwater pipeline in a body of water, the leakage detection system comprising at least one sensor configured to acquire signals related to the temperature of a liquid in a chamber which is configured to be, in use, full of water and extends along a portion of underwater pipeline susceptible to leakage; and at least one control unit connected to the sensor and configured to emit a leakage signal when the temperature of the liquid in the chamber is outside an expected range, wherein the chamber is in communication with the surrounding body of water to enable the inflow and outflow of water to/from the chamber.

Advantageously, the leakage detection system provides for monitoring a critical point of the underwater pipeline, with the precaution of insulating this critical point from the body of water to enable a possible leak to alter the temperature of the liquid in the chamber. In the absence of the chamber, currents and turbulence could disperse the effect of the leakage on the change in temperature of the liquid inside the chamber, and delay detection of the leak or even not allow the leak to be detected. Since the chamber is not watertight, in use, the chamber is full of water without there being a substantial interchange of water inside the chamber.

The interchange of water in the chamber has the purpose of preventing the liquid contained in the chamber acquiring the same temperature as the hydrocarbon due to heat exchange with the underwater pipeline, arriving to a heat balance before the water is remixed with the hydrocarbon coming from a possible leak. Tests performed by Applicant have shown that the heat balance between the hydrocarbon inside the underwater pipeline and the water in the chamber is not reached, even when openings are not present. Openings only increase the temperature difference between the hydrocarbon and the water present in the chamber.

In particular, the control unit is configured to emit a leakage signal when the temperature of the liquid in the chamber remains outside of the expected range for a period of time greater than a predetermined time period. In this way, it is possible to avoid false alarms deriving from measurement errors or temperature oscillations not caused by a hydrocarbon leak.

In accordance with the present disclosure, the leakage detection system comprises a further sensor, which is placed in the body of water outside the chamber and is configured to acquire further signals related to the temperature of the body of water and transmit the further signals to the control unit, which is configured to calculate the expected range as a function of the further signals.

Advantageously, the expected range is calculated as a function of the temperatures of the body of water outside the chamber.

In particular, the leakage detection system has a plurality of chambers distributed along at least one underwater pipeline and a plurality of sensors configured to detect hydrocarbon leakage inside at least one chamber, the control unit being configured to signal the leak and the precise point of the underwater pipeline from where the leak originates. In this way, repair operations are made easier.

In accordance with one embodiment of the disclosure, the leakage detection system comprises two control units, a plurality of sensors and a plurality of further sensors, the sensors and the further sensors being connected to the control units so as to make a redundant leakage detection system. In this way, there is a relatively better probability of performing correct detection, even in the event of malfunctions.

In accordance with the present disclosure, the leakage detection system envisages using optical fiber Bragg grating point sensors. On one hand, the point sensor enables exactly locating the point where the leak was detected. On the other hand, the optical fiber Bragg grating sensor enables detecting temperature variations of a tenth of a degree.

In accordance with a further embodiment of the present disclosure, it is possible to replace said Bragg grating sensors with sensors of a distributed type operating according to Raman or Brillouin backscattering. In the case where distributed sensors are used, the level of measurement precision is lower, but the points where measurements are taken increase significantly.

In accordance with the present disclosure, the leakage detection system comprises a fiber optic cable extending around the underwater pipeline and comprising a plurality of Bragg grating point sensors. In certain embodiments, the Bragg grating point sensors are distributed evenly around the underwater pipeline. In this way, it is possible to identify the point from which a leak originates with high precision.

In accordance with the present disclosure, the chamber has an annular shape and extends around the underwater pipeline. This solution is particularly suitable for identifying leaks on a flanged joint.

From a practical viewpoint, the leakage detection system comprises a casing configured to be coupled to the underwater pipeline and delimiting said chamber together with the underwater pipeline.

To facilitate coupling with the underwater pipeline, the casing comprises two shells hinged together at a first end and selectively connectable to each other at a second end.

In particular, the casing comprises a partition wall, which subdivides the chamber into an inner annular zone in which the sensors are housed and an outer annular zone communicating with the inner annular zone. In this way, the sensors are arranged close to the underwater pipeline.

In accordance with an alternative embodiment of the present disclosure, the casing is configured to adhere to a curved section of an underwater pipeline. The curved sections of the underwater pipeline can also have zones susceptible to possible leaks. In particular, the rigid pipes are subject to fatigue, especially in the curved zones and at the welded joints.

In accordance with a further embodiment of the present disclosure, the chamber is formed inside a flanged joint. In this way, it is not necessary to mount the casing on the underwater pipeline.

In accordance with this embodiment, the flanged joint comprises two flanges having an annular seat configured to accommodate a gasket, a further annular seat to define said chamber, and a plurality of holes, each of which is configured to house a bolt and is arranged between the annular seat and the external further annular seat.

A further advantage of the present disclosure is to provide a hydrocarbon extraction unit for wells in an extraction field that extends along a bed of a body of water that reduces the possible environmental impact to a minimum.

In accordance with the present disclosure, a hydrocarbon extraction unit is provided for wells in an extraction field that extends along a bed of a body of water, the extraction unit comprising a floating production, storage and offloading ("FPSO") vessel, a plurality of underwater pipelines that connect the wells to the FPSO vessel and a leakage detection system of the above-identified type.

A further advantage of the present disclosure is to provide a method for detecting hydrocarbon leakage in an underwater pipeline in a body of water in order alleviate the drawbacks of the known art.

In accordance with the present disclosure, a method is provided for detecting hydrocarbon leakage from an underwater pipeline in a body of water, the method comprising the steps of acquiring signals related to the temperature of the water in a chamber that is not watertight and which extends along a portion of underwater pipeline susceptible to leakage, controlling if the temperature in the chamber is within an expected range, and emitting a leakage signal when the temperature change of the liquid in the chamber is outside the expected range.

In particular, the method comprises the steps of acquiring signals related to the temperature of a liquid in a plurality of chambers full of water and distributed along an underwater pipeline, controlling if the temperature of the liquid in each chamber is within an expected range, emitting a leakage signal when the temperature in at least one chamber is outside an expected range, and indicating the point of the underwater pipeline that is subject to leakage.

Additional features and advantages are described in, and will be apparent from the following Detailed Description and the figures.

BRIEF DESCRIPTION OF THE DRAWINGS

Further characteristics and advantages of various embodiments of the present disclosure will become clear from the description that follows, with reference to the figures in the accompanying drawings, in which:

FIG. 1 is an elevation view, with parts removed schematically and parts removed for clarity, of a hydrocarbon extraction unit using underwater pipelines in an extraction field on the bed of a body of water and equipped with a system for detection of hydrocarbon leakage from an underwater pipeline in a body of water;

FIG. 2 is an elevation view, with parts removed for clarity and on an enlarged scale, of a flanged joint of an underwater pipeline;

FIG. 3 is an elevation view, on a still further enlarged scale, of a detail of the leakage detection system in FIG. 1;

FIG. 8 is a section view, with parts removed for clarity, of a detail of a variant of the embodiment in FIG. 3.

DETAILED DESCRIPTION

Figure 4:
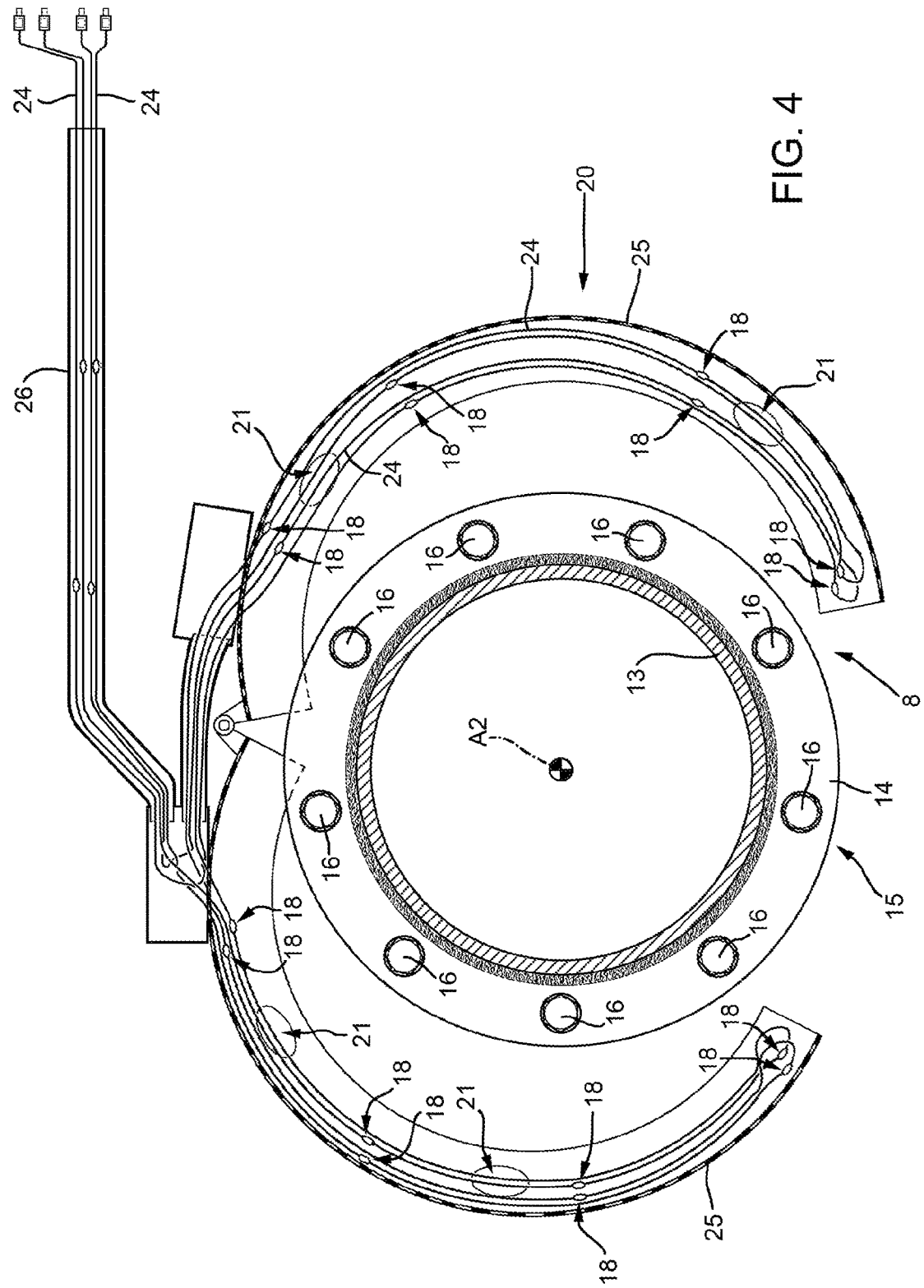
FIG. 4 is a section view, with parts removed for clarity, of a detail of the leakage detection system in FIG. 1 in the installation phase.

Referring now to the example embodiments of the present disclosure illustrated in FIGS. 1 to 8, with reference to FIG. 1, reference numeral 1 shows, as a whole, a hydrocarbon extraction unit configured to extract hydrocarbons from wells 2 in an extraction field 3 that extends along a bed 4 of a body of water 5.

In the case shown, the extraction unit 1 comprises an FPSO vessel 6, namely a floating production, storage and offloading system for hydrocarbons, a single point mooring system 7, a plurality of underwater pipelines 8 that connect the wells 2 to the single point mooring system 7, and a leakage detection system 9 configured to detect hydrocarbon leakage in the underwater pipelines 8. In FIG. 1, reference numeral 10 indicates a buoy configured to define an intermediate support of an underwater pipeline 8.

The single point mooring system 7 comprises a mooring buoy 11 and mooring lines 12 configured to keep the mooring buoy 11 in position. The FPSO vessel 6 is anchored to the mooring buoy 11 and can turn about an axis A1 of the mooring buoy 11 and receive hydrocarbons from the underwater pipelines 8 for subsequent processing and storage.

Each underwater pipeline 8 is defined by a riser formed from flexible pipes 13 of predetermined length, each of which, as is better shown in FIG. 2, is provided with metal flanges 14 at its ends in order to create a flanged joint 15 with another pipe 13.

Referring to FIG. 2, each underwater pipeline 8 extends along an axis A2 and each flanged joint 15 has two facing flanges 14 and an evenly distributed series of bolts 16 and nuts 17 coupled together to tighten the two flanges 14. The flanged joint 15 is, effectively, a section of the underwater pipeline 8 susceptible to leakage.

Referring to FIG. 3, the leakage detection system 9 comprises sensors 18 configured to acquire signals related to the temperature of the liquid in a chamber 19 that extends along a portion of pipeline 8 susceptible to leakage, and is in communication with the surrounding body of water 5 to enable water interchange. The hydrocarbon extracted from underground has a different temperature from the body of water 5 and even a slight leak is able to change the temperature inside the chamber 19. In the case shown in FIG. 3, the chamber 19 has an annular shape, is delimited by a casing 20 fitted on the underwater pipeline 8, on the flanges 14 in the case in point, and has the function of containing a small volume surrounding the underwater pipeline 8 to optimize data acquisition by the sensor 18. In practice, the casing 20 has openings 21 that enable a controlled inflow and outflow of water to/from the chamber 19 to prevent an increase in the temperature of the liquid in the chamber 19 that could be caused by heat exchange with the hydrocarbon that flows in the underwater pipeline 8.

In an alternative embodiment of the present disclosure the openings 21 are omitted. Nevertheless, the casing 20 is not watertight and, in use, the chamber 19 is full of water.

Referring to FIG. 1, the leakage detection system 9 comprises at least one control unit 22 connected to the sensor 18 and configured to detect temperature variations in the chamber 19 as a function of the signals acquired from the sensor 18, and to signal a leak when the detected temperature is outside an expected range. In practice, the leakage detection system 9 is structured to acquire signals related to the temperature using the above-described methods at each flanged joint 15 to monitor all possible leaks in the underwater pipelines 8. The control unit 22 is configured to signal which underwater pipeline 8 is subject to leakage and exactly which chamber 19 has been contaminated by a hydrocarbon. In this way, it is possible to define the exact point of the leak with precision in order to aid and accelerate repair operations. To this end, the control unit 22 has a map of the sensors 18 that enables indicating the underwater pipeline 8 and the exact point along the underwater pipeline 8 that has a hydrocarbon leak. The leakage detection system 9 comprises at least one sensor 23, which is placed in the body of water outside the chamber 19 and is configured to acquire further signals related to the temperature of the body of water and transmit the further signals to the control unit 22, which calculates the expected range as a function of these further signals. In practice, the leakage detection system 9 comprises a plurality of sensors 23, each of which is placed along a respective pipe 13 at the center line of the pipe 13 (i.e., at the point of maximum distance from the flanges 14), and, if necessary, close to the flange 15 outside the chamber 19.

In the case shown, the leakage detection system 9 is redundant and comprises two control units 22 that are connected to respective sensors 18 and sensors 23.

Referring to FIG. 4, each sensor 18 is an optical fiber Bragg grating point sensor (FBG).

A fiber optic cable 24 extending around the underwater pipeline 8 has a plurality of Bragg grating point sensors 18. The greater the number or quantity of sensors 18, the more precise is the localization of the leak. In the case shown, the Bragg grating point sensors 18 are distributed around the underwater pipeline 8. In addition, the redundant leakage detection system 9 envisages two fiber optic cables 24 wrapped around the underwater pipeline 8 (i.e., at the flanged joint 15).

The annular-shaped casing 20 is configured to be coupled to the underwater pipeline 8 and delimit the chamber 19 together with the underwater pipeline 8 (FIG. 3). In the case shown, the casing 20 comprises two shells 25 hinged together at a first end and selectively connectable to each other at a second end. The casing 20 is configured to support the fiber optic cables 24 that are protected outside the casing 20 with sheathing 26.

Figure 5:
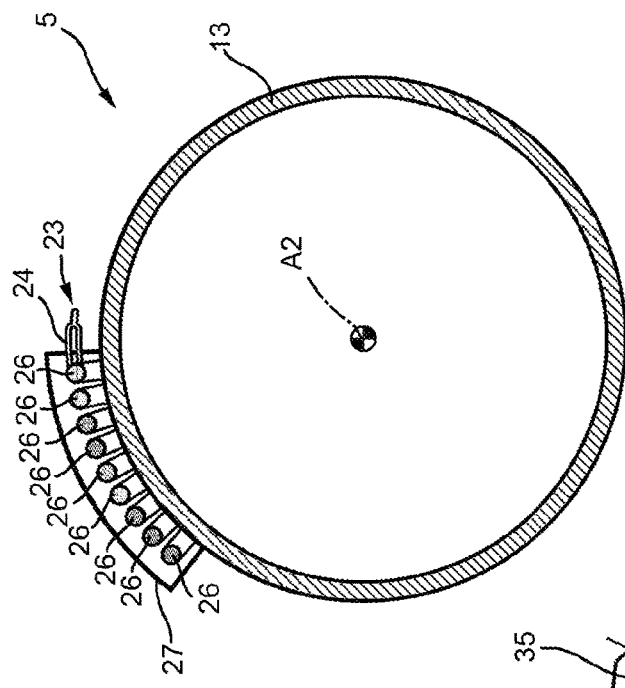
FIG. 5 is a section view, with parts removed for clarity, of a detail of the present disclosure.

Referring to FIG. 5, the plurality of fiber optic cables 24 and the associated sheathing 26 are fastened to each pipe 13 by a fairlead 27 fastened at the center line of the pipe 13. In this embodiment, a fiber optic cable 24 has a sensor 23 configured to detect the temperature of the body of water 5 in this zone.

In use, and with reference to FIG. 1, the chamber 19 is occupied by a liquid that, in the case of no leaks, is water, in the case of a small leak, is a mixture of water and hydrocarbon and, in the case of a significant leak, is mainly constituted by the hydrocarbon. The body of water 5 and the extracted hydrocarbon have naturally different temperatures. Sensors 18 acquire signals related to the temperature of the liquid in the chamber 19, while sensors 23 acquire signals related to the temperature of the body of water 5 outside the chamber 19. The control unit 22 calculates an expected range for values of the temperature in the chamber 19 as a function of the signals acquired from sensors 23 and characteristics related to the extraction site, checks if the temperature changes of the liquid in the chamber 19 are outside an expected range, signals a leak when the detected temperature is outside an expected range and indicates the exact point where the leak occurred.

In particular, leakage signaling occurs when the detected temperature remains outside the expected range for a predetermined period of time. Effectively, the map of the detection system 9 enables identifying from which underwater pipeline 8 and from which precise point along the axis of the pipeline 8 the leak originated.

Figure 6:
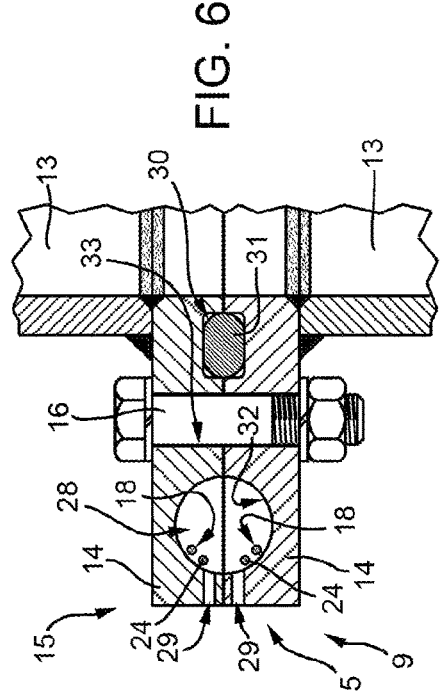
FIG. 6 is a section view, with parts removed for clarity, of an alternative embodiment of the present disclosure.

Referring to the embodiment in FIG. 6, the flanged joint 15 is configured so as to define a chamber 28 inside which sensors 18 are arranged. The flanged joint 15 has openings 29 that place the chamber 28 in communication with the body of water 5.

In an alternative embodiment of the present disclosure, the openings 29 are omitted. Nevertheless, the chamber 28 is not watertight and, in use, is full of water.

The flanges 14 have an annular seat 30 configured to accommodate a gasket 31, an annular seat 32 to define said chamber 28 and a plurality of holes 33, each of which is configured to house a bolt 16 and is arranged between annular seat 30 and annular seat 32.

Figure 7:
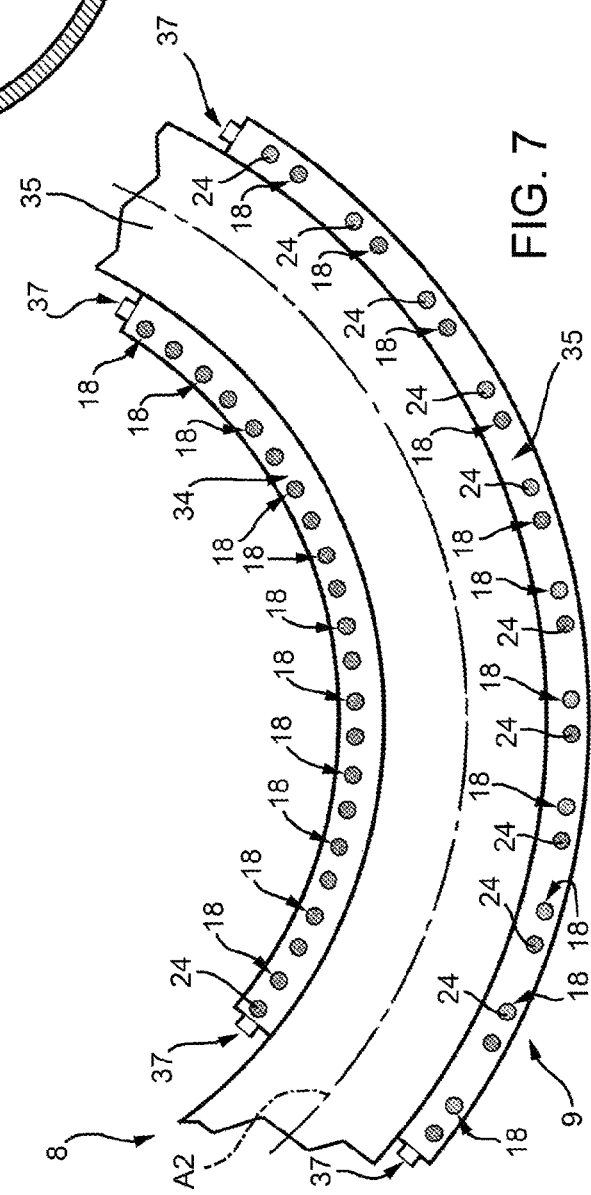
FIG. 7 is an elevation view, with parts in section and parts removed for clarity, of a further alternative embodiment of the present disclosure.

Referring to FIG. 7, reference numeral 34 indicates a casing arranged along a curved section of a rigid metal pipe 35 configured to be joined by welding. In this case, the underwater pipeline 8 comprises at least one rigid metal pipe 35, not necessarily part of the extraction unit 1.

The casing 34 and the pipe 35 form a chamber 36 communicating with the surrounding body of water 5 through openings 37 made in the casing 34.

In an alternative embodiment of the present disclosure, the openings 37 are omitted. Nevertheless, the casing 34 is not watertight and, in use, the chamber 36 is full of water.

A plurality of sensors 18 are housed in the chamber 36 and distributed along a plurality of fiber optic cables 24 wrapped around the pipe 35 and, in turn, distributed along the curved section of the pipe 35, which is a zone susceptible to hydrocarbon leakage.

Referring to the variant in FIG. 8, a chamber 38 surrounds a flanged joint 15 and is delimited by a casing 39, which does not have openings that place the chamber 38 in communication with the outside environment. Nevertheless, the coupling of the casing 39 to the flanged joint 15, or rather the pipe 13, and the necessary couplings between the parts of the casing 39 are not watertight and, in use, the chamber 38 is full of water.

The casing 39 also has a partition wall 40 that divides the chamber 38 into a zone 41 next to the flanged joint 15 and a zone 42 set apart from the flanged joint 15. The casing 39, the chamber 38 and the zones 41 and 42 have respective annular shapes. Zones 41 and 42 are in communication with each other through openings 43 made in the partition wall 40.

Basically, the partition wall 40 has the function of keeping the sensors 18 as close as possible to the flanged joint 15.

Finally, it is evident that variants can be made with respect to the embodiments of the present disclosure described with reference to the accompanying drawings without departing from the scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A hydrocarbon leakage detection system comprising:
at least one sensor configured to acquire at least one signal related to a temperature of a liquid in a chamber containing water which extends along a portion of an underwater pipeline in a body of water which is susceptible to leakage, wherein the chamber is in communication with the body of water to enable an inflow of water to the chamber and an outflow of water from the chamber; and
at least one control unit connected to the at least one sensor and configured to emit a leakage signal when the temperature of the liquid in the chamber is outside an expected range.

2. The hydrocarbon leakage detection system of claim 1, wherein the at least one control unit is configured to emit the leakage signal when the temperature of the liquid in the chamber remains outside of the expected range for a period of time greater than a predetermined period of time.

3. The hydrocarbon leakage detection system of claim 1, which includes another sensor placed in the body of water outside the chamber, wherein said other sensor is configured to:

acquire at least another signal related to the temperature of the body of water, and
transmit the at least other signal to the at least one control unit to calculate the expected range as a function of the at least one other signal.

4. The hydrocarbon leakage detection system of claim 1, which includes:
a plurality of chambers distributed along the underwater pipeline, and
a plurality of sensors configured to detect any hydrocarbon leakage inside at least one of the chambers,
wherein the control unit is configured to indicate a location of the underwater pipeline from where the leak originates.

5. The hydrocarbon leakage detection system of claim 1, which includes:
two control units,
a plurality of first sensors connected to the two control units, and
a plurality of second sensors connected to the two control units.

6. The hydrocarbon leakage detection system of claim 1, wherein the at least one sensor includes an optical fiber Bragg grating point sensor.

7. The hydrocarbon leakage detection system of claim 6, which includes a fiber optic cable extending around the underwater pipeline and including a plurality of Bragg grating point sensors.

8. The hydrocarbon leakage detection system of claim 7, wherein the plurality of Bragg grating point sensors are distributed around the underwater pipeline.

9. The hydrocarbon leakage detection system of claim 8, wherein the plurality of Bragg grating point sensors are evenly distributed around the underwater pipeline.

10. The hydrocarbon leakage detection system of claim 1, wherein the chamber has an annular shape and extends around the underwater pipeline.

11. The hydrocarbon leakage detection system of claim 10, which includes a casing configured to be coupled to the underwater pipeline and configured to delimit said chamber together with the underwater pipeline.

12. The hydrocarbon leakage detection system of claim 11, wherein the casing includes a partition wall which subdivides the chamber into an inner annular zone in which the at least one sensor is housed and an outer annular zone in communication with the inner annular zone.

13. The hydrocarbon leakage detection system of claim 11, wherein the casing includes two shells hinged together at a first end and selectively connectable to each other at a second end.

14. The hydrocarbon leakage detection system of claim 11, wherein the casing includes at least one opening to enable the inflow of water to the chamber from the body of water and the outflow of water from the chamber to the body of water.

15. The hydrocarbon leakage detection system of claim 11, wherein the casing is configured to support at least one fiber optic cable inside the chamber.

16. The hydrocarbon leakage detection system of claim 11, wherein the casing is configured to adhere to opposite faces of a flanged joint of the underwater pipeline.

17. The hydrocarbon leakage detection system of claim 11, wherein the casing is configured to adhere to a curved section of the underwater pipeline.

18. The hydrocarbon leakage detection system of claim 1, wherein the chamber is formed inside a flanged joint.

19. The hydrocarbon leakage detection system of claim 18, wherein the flanged joint includes:
two flanges having a first annular seat configured to accommodate a gasket,
a second annular seat which defines said chamber, and
a plurality of holes each of which is configured to house a bolt and is arranged between the first annular seat and the second annular seat.

20. A hydrocarbon extraction unit for at least one well in an extraction field that extends along a bed of a body of water, the hydrocarbon extraction unit comprising:
a floating production, storage and offloading vessel,
a plurality of underwater pipelines that connect the at least one well to the floating production, storage and offloading vessel, and
a leakage detection system including
at least one sensor configured to acquire at least one signal related to a temperature of a liquid in a chamber containing water which extends along a portion of one of the underwater pipelines in the body of water which is susceptible to leakage, wherein the chamber is in communication with the body of water to enable an inflow of water to the chamber and an outflow of water from the chamber; and
at least one control unit connected to the at least one sensor and configured to emit a leakage signal when the temperature of the liquid in the chamber is outside an expected range.

21. A method for detection of hydrocarbon leakage from an underwater pipeline in a body of water, the method comprising:
acquiring at least one signal related to a temperature of a liquid in a chamber that is not watertight and which extends along a portion of the underwater pipeline which is susceptible to leakage;
determining if the temperature of the liquid in the chamber is within an expected range, and
emitting a leakage signal when the temperature of the liquid in the chamber is outside the expected range.

22. The method of claim 21, which includes emitting the leakage signal when the temperature of the liquid in the chamber remains outside of the expected range for a period of time greater than a predetermined period of time.

23. The method of claim 21, which includes:
acquiring at least another signal related to a temperature of the body of water outside the chamber, and
calculating the expected range as a function of the at least one other signal.

24. The method of claim 21, which includes:
acquiring a plurality of signals related to a temperature of a liquid in a plurality of chambers full of water and distributed along the underwater pipeline,
determining if the temperature of the liquid in each chamber is within an expected range,
emitting the leakage signal when the temperature in at least one of the chambers is outside the expected range, and
indicating a point of the underwater pipeline that is subject to leakage.

25. The method of claim 21, which includes:
acquiring two signals related to the temperature at a point inside the chamber via two sensors, and
processing the two acquired signals via two respective control units.

26. The method of claim 25, which includes acquiring a plurality of signals related to a temperature at a plurality of points around the underwater pipeline via a fiber optic cable extending around the underwater pipeline, along which a plurality of sensors are arranged.

27. A hydrocarbon leakage detection system comprising:
at least one sensor configured to acquire at least one signal related to a temperature of a liquid in a chamber containing water which extends along a portion of an underwater pipeline in a body of water which is susceptible to leakage, wherein a leakage signal is emitted when the temperature of the liquid in the chamber is outside an expected range and the chamber is in communication with the body of water to enable an inflow of water to the chamber and an outflow of water from the chamber.

28. The hydrocarbon leakage detection system of claim 27, wherein the leakage signal is emitted when the temperature of the liquid in the chamber remains outside of the expected range for a period of time greater than a predetermined period of time.

29. The hydrocarbon leakage detection system of claim 27, which includes another sensor placed in the body of water outside the chamber, wherein said other sensor is configured to:
acquire at least another signal related to the temperature of the body of water, and
transmit the at least other signal, wherein the expected range is calculated as a function of the at least one other signal.

30. The hydrocarbon leakage detection system of claim 27, which includes:
a plurality of chambers distributed along the underwater pipeline, and
a plurality of sensors configured to detect any hydrocarbon leakage inside at least one of the chambers.

31. The hydrocarbon leakage detection system of claim 27, wherein the at least one sensor includes an optical fiber Bragg grating point sensor.

32. The hydrocarbon leakage detection system of claim 31, which includes a fiber optic cable extending around the underwater pipeline and including a plurality of Bragg grating point sensors.

33. The hydrocarbon leakage detection system of claim 32, wherein the plurality of Bragg grating point sensors are distributed around the underwater pipeline.

34. The hydrocarbon leakage detection system of claim 33, wherein the plurality of Bragg grating point sensors are evenly distributed around the underwater pipeline.

35. The hydrocarbon leakage detection system of claim 27, wherein the chamber has an annular shape and extends around the underwater pipeline.

36. The hydrocarbon leakage detection system of claim 35, which includes a casing configured to be coupled to the underwater pipeline and configured to delimit said chamber together with the underwater pipeline.

37. The hydrocarbon leakage detection system of claim 36, wherein the casing includes a partition wall which subdivides the chamber into an inner annular zone in which the at least one sensor is housed and an outer annular zone in communication with the inner annular zone.

38. The hydrocarbon leakage detection system of claim 36, wherein the casing includes two shells hinged together at a first end and selectively connectable to each other at a second end.

39. The hydrocarbon leakage detection system of claim 36, wherein the casing includes at least one opening to enable the inflow of water to the chamber from the body of water and the outflow of water from the chamber to the body of water.

40. The hydrocarbon leakage detection system of claim 36, wherein the casing is configured to support at least one fiber optic cable inside the chamber.

41. The hydrocarbon leakage detection system of claim 36, wherein the casing is configured to adhere to opposite faces of a flanged joint of the underwater pipeline.

42. The hydrocarbon leakage detection system of claim 36, wherein the casing is configured to adhere to a curved section of the underwater pipeline.

43. The hydrocarbon leakage detection system of claim 27, wherein the chamber is formed inside a flanged joint.

44. The hydrocarbon leakage detection system of claim 43, wherein the flanged joint includes:
- two flanges having a first annular seat configured to accommodate a gasket,
- a second annular seat which defines said chamber, and
- a plurality of holes each of which is configured to house a bolt and is arranged between the first annular seat and the second annular seat.

* * * * *